(12) United States Patent
Saptharishi et al.

(10) Patent No.: US 8,073,254 B2
(45) Date of Patent: *Dec. 6, 2011

(54) METHODS AND SYSTEMS FOR DETECTING OBJECTS OF INTEREST IN SPATIO-TEMPORAL SIGNALS

(75) Inventors: Mahesh Saptharishi, Waltham, MA (US); John B. Hampshire, II, Irvine, MA (US)

(73) Assignee: VideoIQ, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,850

(22) Filed: Nov. 3, 2009

(65) Prior Publication Data

US 2010/0046799 A1     Feb. 25, 2010

Related U.S. Application Data

(63) Continuation of application No. 10/884,486, filed on Jul. 1, 2004, now Pat. No. 7,627,171.

(60) Provisional application No. 60/485,085, filed on Jul. 3, 2003.

(51) Int. Cl.
*G06K 9/34*     (2006.01)

(52) U.S. Cl. ........................................ 382/173; 382/180

(58) Field of Classification Search .................. 382/128, 382/131, 162, 164, 173, 180
See application file for complete search history.

(56) References Cited

U.S. PATENT DOCUMENTS

| | | | |
|---|---|---|---|
| 4,639,784 A | 1/1987 | Fling | |
| 4,779,095 A | 10/1988 | Guerreri | |
| 4,931,868 A | 6/1990 | Kadar | |
| 5,091,780 A | 2/1992 | Pomerleau | |
| 5,099,322 A | 3/1992 | Gove | |
| 5,212,547 A | 5/1993 | Otsuki | |
| 5,253,070 A | 10/1993 | Hong | |
| 5,268,967 A | 12/1993 | Jang et al. | |
| 5,825,936 A | 10/1998 | Clarke et al. | |
| 6,577,762 B1 | 6/2003 | Seeger et al. | |
| 7,227,988 B2 | 6/2007 | Curry et al. | |
| 7,627,171 B2 * | 12/2009 | Hampshire et al. | 382/173 |
| 2003/0088532 A1 | 5/2003 | Hampshire, II | |

OTHER PUBLICATIONS

Collins RT et al., "A System for Video Surveillance and Monitoring," Robotics Institute, Proc. American Nuclear Society (ANS) Eight Annual Topical Meeting on Robotics and Remote Systems. Pittsburgh PA: Apr. 1999.

(Continued)

*Primary Examiner* — Duy M Dang
(74) *Attorney, Agent, or Firm* — Stoel Rives LLP

(57) ABSTRACT

Methods and systems detect objects of interest in a spatio-temporal signal. According to one embodiment, a system processes a digital spatio-temporal input signal containing zero or more foreground objects of interest superimposed on a background. The system comprises a foreground/background separation module, a foreground object grouping module, an object classification module, and a feedback connection. The foreground/background separation module receives the spatio-temporal input signal and, according to one or more adaptable parameters, produces foreground/background labels designating elements of the spatio-temporal input signal as either foreground or background. The foreground object grouping module is connected to the foreground/background separation module and identifies groups of selected foreground-labeled elements as foreground objects. The object classification module is connected to the foreground object grouping module and generates object-level information related to the foreground object. The object-level information adapts the one or more adaptable parameters of the foreground/background separation module, via the feedback connection.

31 Claims, 9 Drawing Sheets

OTHER PUBLICATIONS

Eveland Christopher et al., "Background Modeling for Segmentation of Video-Rate Stereo Sequences," Computer Vision and Pattern Recognition, 1998 Proceedings, 1998 IEEE Computer Society Conference on.

Gavrila, D.M. et al., "Real-Time Object Detection Using Distance Transforms," *1998 IEEE International Conference on Intelligent Vehicles*; pp. 274-279.

McIvor, Alan M., "Background Subtraction Techniques," Proc. of Image and Vision Computing, Auckland, New Zealand, 2000.

Mikic, Ivana et al., "Moving Shadow and Object Detection in Traffic Scenes," 15th International Conference on Pattern Recognition, 2000.

Oren, Michael et al., "A Trainable System for People Detection," Proceedings of Image Understanding Workshop, CBCL and AI Lab, MIT, Cambridge MA, 1997.

Stenger, B. et al , "Topology Free Hidden Markov Models: Application to Background Modeling," IEEE International Conference on Computer Vision, 2001.

\* cited by examiner

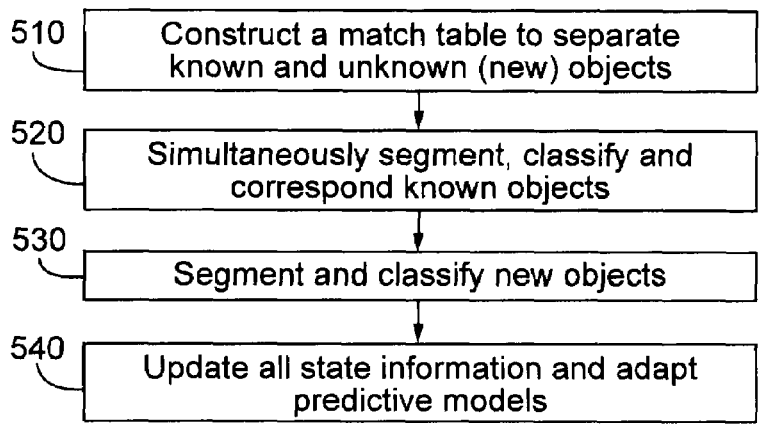
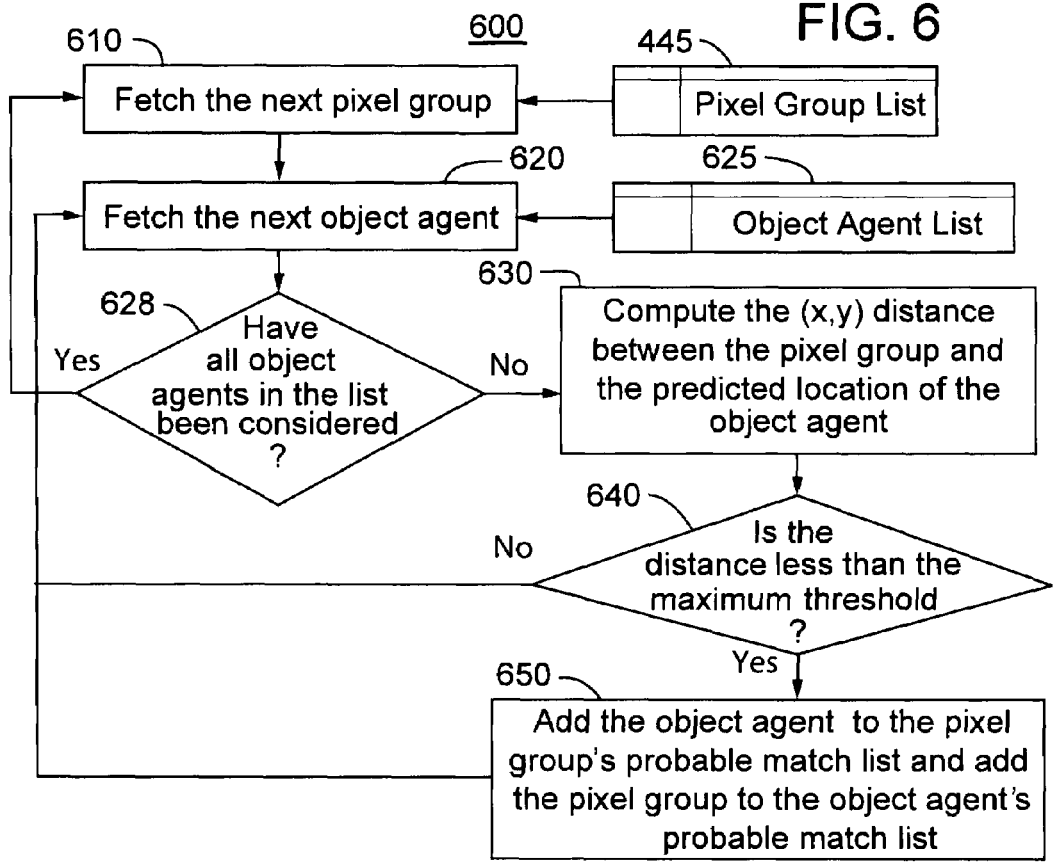

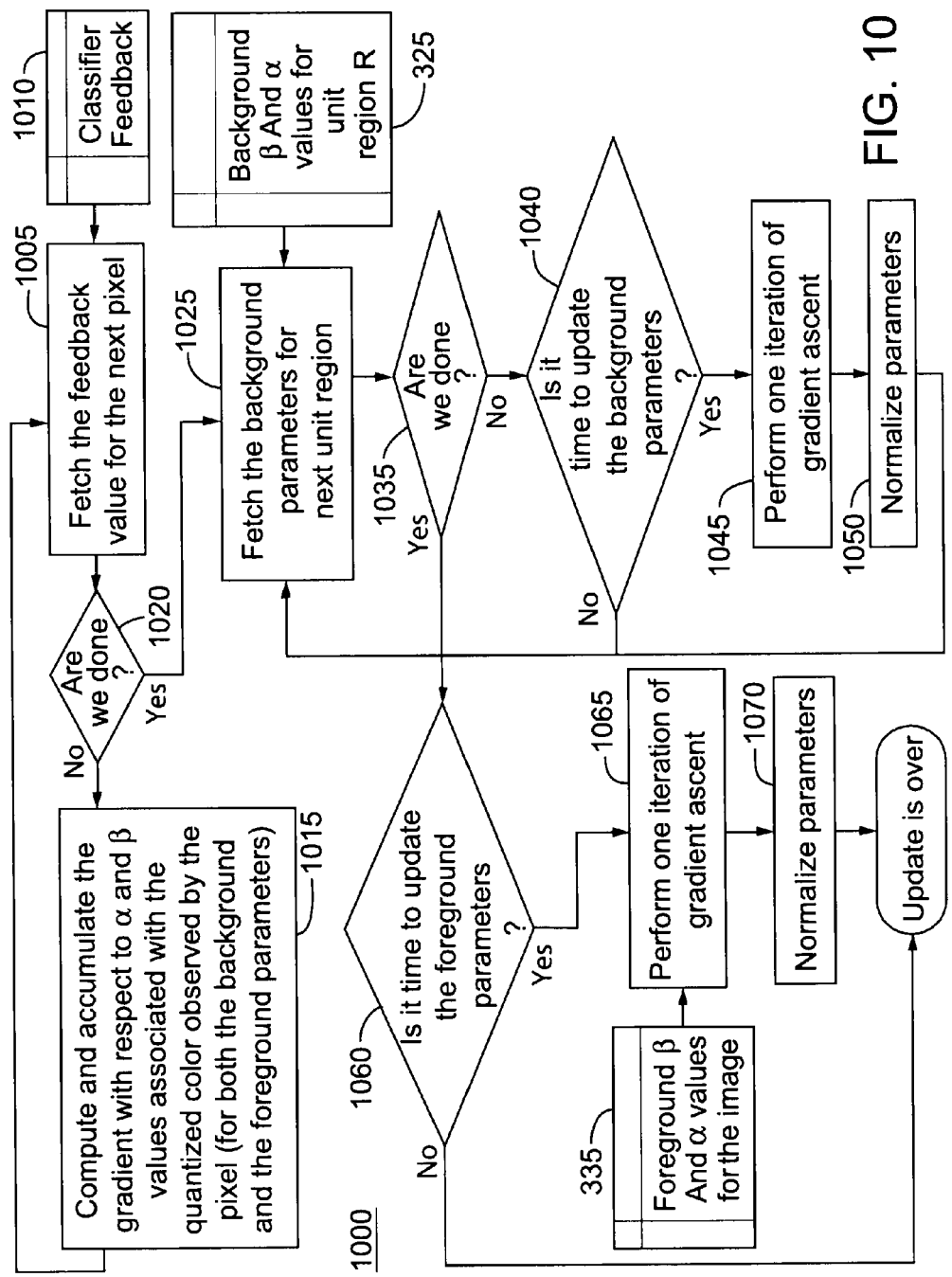

METHODS AND SYSTEMS FOR DETECTING OBJECTS OF INTEREST IN SPATIO-TEMPORAL SIGNALS

RELATED APPLICATIONS

This application is a continuation of U.S. patent application Ser. No. 10/884,486, filed Jul. 1, 2004, titled "Methods and Systems for Detecting Objects of Interest in Spatio-temporal Signals," which claims the benefit under 35 U.S.C. §119(e) to U.S. Provisional Application No. 60/485,085, filed Jul. 3, 2003. U.S. patent application Ser. No. 10/884,486 and U.S. Provisional Application No. 60/485,085 are both incorporated herein by reference.

TECHNICAL FIELD

This disclosure relates generally to image analysis and more particularly to object detection in spatio-temporal signals.

BACKGROUND INFORMATION

Surveillance systems typically employ video cameras or other sensors to collect spatio-temporal data. In the simplest systems, that data is displayed for contemporaneous screening by security personnel and/or recorded for later reference after a security breach. In those systems, the task of detecting objects of interest is performed by a human observer. A significant advance occurs when the system itself is able to perform object detection itself, either partially or completely.

In a typical outdoor surveillance system, for example, one may be interested in detecting objects such as humans, vehicles, animals, etc., that move through the environment. Different objects might pose different threats or levels of alarm. For example, an animal in the scene might be perfectly normal, but a human or a vehicle in the scene might be cause for an alarm and might require the immediate attention of a security guard. In addition to legitimate activity in the scene (humans, vehicles, animals, etc.), the environment might be susceptible to significant lighting changes, background motion such as moving foliage and camera jitter due to a strong wind. An effective object-of-interest detection algorithm should be able to discern objects of interest in a highly dynamic environment in a timely fashion. A powerful surveillance system ideally has the capability to detect objects of interest while scoring high on the following benchmarks: (1) accuracy; (2) computational efficiency; and (3) flexibility. An accurate system detects objects of interest with high probability while achieving a very low false alarm rate. The computational workload should be manageable enough to provide its detection results and raise alarms while not missing any relevant activity in the environment and guiding a human operator's attention to the activity as it is happening. A flexible system can handle multiple input modalities and multiple operating conditions seamlessly.

There are presently a variety of algorithms and strategies for automatic object detection in a spatio-temporal signal. Most of those detection methods cater to a subset of the operating conditions underlying the intended applications of the algorithm. It is known, for example, to employ a classification mechanism that maps a given spatial region of a spatio-temporal signal to one of a finite set of object types. Algorithms differ in how they process or search the spatio-temporal signal prior to the classification stage. Some algorithms employ a focus-of-attention mechanism to limit the extent of the search to less than the signal's full spatial extent.

A focus-of-attention mechanism that identifies possible regions that could contain an object of interest is often referred to as foreground/background separation. Foreground/background separation in prior art fundamentally relies on some notion of an outlier. This notion is typically quantified in terms of some probability threshold. Almost all the existing algorithms either rely on outlier metrics completely (memory-based algorithms) or rely on conceptual classification mechanisms completely (memory-less algorithms). The latter tend to be computationally overwhelming and not suitable for real time algorithms. The former tend to be fast, but not as robust. Using sophisticated models for outlier detection such as multi-modal distributions, accounts for the dynamic and periodic nature of the background component, but it does not explicitly account for the statistics of the foreground component. Furthermore, outlier-based techniques are not sensitive to subtle differences in the chromatic signatures of objects of interest and that of the environment. Overall, then, existing techniques suffer from one or both of (1) a lack of performance, i.e., high false positives and negatives; and (2) a high computational cost.

SUMMARY OF THE DISCLOSURE

The present invention is directed at methods and systems for detecting objects of interest in a spatio-temporal signal.

According to one embodiment, a system processes a digital spatio-temporal input signal containing zero or more foreground objects of interest superimposed on a background. The system comprises a foreground/background separation module, a foreground object grouping module, an object classification module, and a feedback connection. The foreground/background separation module receives the spatio-temporal input signal as an input and, according to one or more adaptable parameters, produces as outputs foreground/background labels designating elements of the spatio-temporal input signal as either foreground or background. The foreground object grouping module is connected to the foreground/background separation module and identifies groups of selected foreground-labeled elements as foreground objects. The object classification module is connected to the foreground object grouping module and generates object-level information related to the foreground object. The object-level information adapts the one or more adaptable parameters of the foreground/background separation module, via the feedback connection.

According to another embodiment, a method processes a spatio-temporal signal containing zero or more foreground objects of interest superimposed on a background. The method receives the spatio-temporal signal, which comprises a number of elements, and separates, according to one or more adaptable separation parameters, the elements of the spatio-temporal signal into a foreground category or a background category. The method groups selected foreground-labeled elements in the spatio-temporal signal together as foreground object(s), thereby resulting in zero or more foreground objects, and generates object-level information related to the foreground object(s). The method also adapts the one or more adaptable separation parameters of the foreground/background separation mechanism on the basis of the object-level information.

As used herein, the term "spatio-temporal signal" means a time-varying or potentially time-varying signal across one or more spatial dimensions, hyperspatial dimensions, or other bases that can be analogized to spatial or hyperspatial dimensions; in general, a spatio-temporal signal is of the form $s(\mathbb{R}^n,t)$ where $n \geq 1$. Also as used herein, the term "connected" means logically or physically connected directly or indirectly through one or more intermediaries.

Details concerning the construction and operation of particular embodiments are set forth in the following sections with reference to the below-listed drawings.

BRIEF DESCRIPTION OF THE DRAWINGS

FIG. 3-10 are flowcharts of details of particular implementations of the steps of the method of FIG. 2.

DETAILED DESCRIPTION OF AN EMBODIMENT

With reference to the above-listed drawings, this section describes particular embodiments and their detailed construction and operation. As one skilled in the art will appreciate in view of this disclosure, certain embodiments may be capable of achieving certain advantages over the known prior art, including some or all of the following: (1) taking advantage of the tremendous amount of object level information available via the classification mechanism as a guiding hand to the online learning algorithm directing the modification of parameters at the foreground/background separation level; (2) increasing sensitivity to subtle differences in the chromatic signature of objects by adapting the parameters discriminatively; (3) increasing performance; (4) reducing computational complexity; (5) increasing flexibility; (6) detecting objects in highly dynamic environments; (7) identifying types of moving objects; (8) better parsing of an environment into regions with salient physical properties; (9) handling gradual camera motion; (10) scaling to multiple zoom resolutions; and (11) adapting in real-time to changing illumination and/or environmental conditions and foreground/background appearance (e.g., a change in pose). These and other advantages of various embodiments will be apparent upon reading the following.

Figure 1:
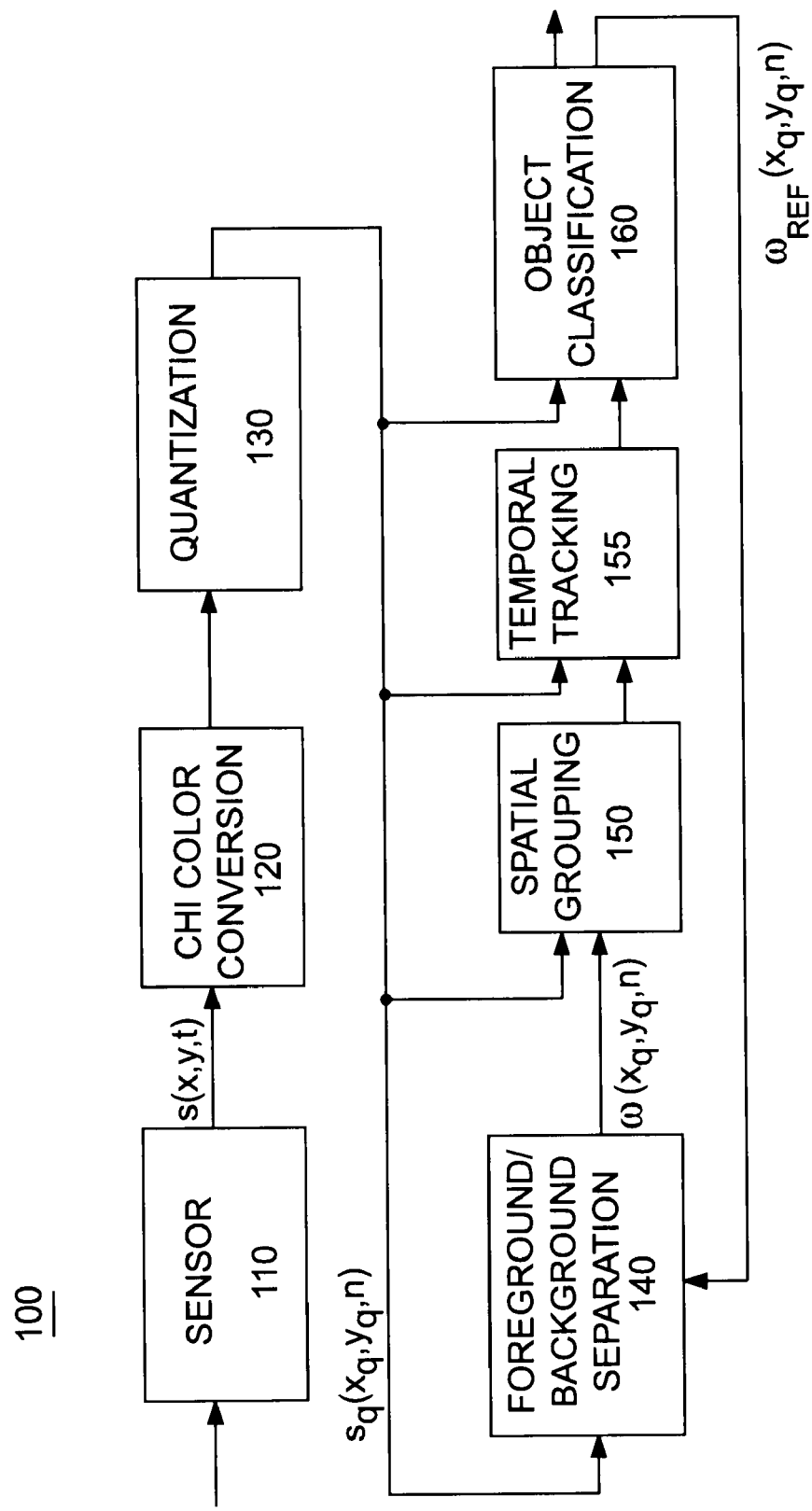
FIG. 1 is block diagram of an object detection system according to one embodiment.

FIG. 1 is a block diagram of an object detection system 100 according to one embodiment. The object detection system 100 processes a spatio-temporal signal, denoted s(x,y,t) for convenience and not by way of limitation, to detect objects of interest in the signal. Although the spatio-temporal signal s(x,y,t) may be of any general form in any number of spatial, hyperspatial, or spatially analogous dimensions, it is ordinarily a two-dimensional motion video signal. A sensor 110 collects spatio-temporal data. The sensor 110 is typically a camera, such as a charge-coupled device (CCD) camera, that generates a video signal, although the sensor 110 could capture data from outside the visible spectrum (e.g., thermal energy). Moreover, although the sensor 110 typically collects data over a two-dimensional spatial space, the sensor 110 may collect data of a greater dimensionality (e.g., stereo vision) or over only a single dimension. An example of the former is hyperspectral video, which is based on more than three measurement frequency bands of the electromagnetic spectrum. The measurement bands may be inside or outside the visible spectrum. Examples of a spatio-temporal signal in a one-dimensional space include spectograms, which are based on frequency domain transformations, such as Fourier or Wavelet transforms. A spectrogram is of the form s(x,t) and represents signal strength as a function of frequency (x) and time (t). Spectograms are useful in many applications, such as, speech recognition, for example. In that case, components of speech are foreground objects, and all other sounds constitute the background. The system 100 can process such signals in a manner that will be apparent from the remainder of this document (i.e., the foreground/background separator 140 labels elements of the signal as speech or not speech; the spatial grouper 150 groups selected, related speech elements together, using, for example, harmonic relationships; the temporal tracker 155 tracks the speech of multiple speakers and multi-syllabic patterns over time in the acoustic "scene"; and the object classifier 160 determines when words of interest have been spoken, feeding back those determinations to the separator 140 to improve its performance through learning or adaptation).

Returning to the prototypical example of a two dimensional video signal, today's most prevalent sensors generate color video signals encoded in a red-green-blue (RGB) color space representation. Preferably, a CHI color converter 120 converts the signal from its native form (e.g., RGB) to a CHI color representation. Such a conversion can be accomplished according to the teachings set forth in commonly-owned U.S. patent application Ser. Nos. 10/811,376, filed by the present inventors on Mar. 25, 2004, and 60/457,748, filed by the present inventors on Mar. 25, 2003, both of which are incorporated herein by reference. Preferably, the CHI-encoded spatio-temporal signal is compressed by a quantizer 130, which may be, for example, a vector quantizer. Although the CHI color converter 120 and the quantizer 130 are optional, they are advantageous in that they better represent the sensor data and reduce the data bandwidth, respectively.

In any event, a spatio-temporal signal $s_q(x_q,y_q,n)$, which is a value-, space-, and time-quantized version of s(x,y,t), is processed further by the remaining subsystems or modules of the system 100: a foreground/background separator 140, a spatial grouper 150, a temporal tracker 155, and an object classifier 160. Together those subsystems work in an interrelated manner to detect objects of interest (OOI) in the spatio-temporal signal $s_q(x_q,y_q,n)$. Broadly speaking, the foreground/background separator 140 labels each element of the signal as either a foreground element or a background element. The spatial grouper 150 groups spatially contiguous foreground elements together and identifies them as foreground objects. The temporal tracker 155, an optional module, tracks the movement of foreground objects over time. The object classifier 160 classifies the foreground objects according to a taxonomy of possible object types, some of which are types of interest. Those foreground objects classified as a type that is of interest are flagged as objects of interest. Finally, object-level information generated by the object classifier 160 is fed back to the foreground/background separator 140 in order to adapt the parameters of the foreground/background separator 140 and thereby improve its performance. Additional details regarding the foreground/background separator 140, the spatial grouper 150, the temporal tracker 155, and the object classifier 160 are presented next.

The environment and the objects to be detected in the spatio-temporal signal $s_q(x_q,y_q,n)$ manifest themselves as spatially and temporally ordered sets of signal values. Each such ordered set of signal values is considered to be a set of "signal generators"; such a set constitutes a small subset of the total number of values that $s_q(x_q,y_q,n)$ can assume. At the nth time interval, $s_q(x_q,y_q,n)$ at spatial coordinates $<x_q,y_q>$ takes its value from either a foreground or background object, both of which have an associated set of signal generators. The background and the foreground objects may or may not share the same set of generators. The generators themselves are abstract constructs intended to encapsulate characteristic sets of signal values (or "signatures") associated with specific spatial background regions and foreground objects in $s_q(x_q,y_q,n)$. The set of generators has N members $\{\mathcal{G}_1, \mathcal{G}_2, \ldots \mathcal{G}_N\}$. Two discriminant functions—one for foreground objects $\gamma_{Fg}$ and one for background regions $\gamma_{Bg}$—partition the space of all generators into a set that most likely corresponds to foreground and a set that most likely corresponds to background. The background and foreground discriminant functions can take additional contextual information, such as location, into account. Background generator sets are generally associated with specific regions (i.e., $<x_q, y_q>$ coordinates clustered together in a locale), whereas foreground generator sets are generally associated with the entire spatial domain of $s_q(x_q,y_q,n)$. Put another way, background generator sets are spatially localized because background doesn't move, whereas foreground generator sets are spatially global because foreground objects do move. The background and foreground discriminant functions can be derived from a Markovian model using a causal Bayesian inference formulation described below.

A Markovian model of the spatio-temporal signal $s_q(x_q,y_q,n)$ can be formulated, which generates a particular temporal sequence of colors associated with an object possessing a set of generators. Environmental conditions such as illumination changes and artifacts introduced by the sensor can distort the color produced by the generators. Sensor-specific quantization based on a physical model of the sensor can account for certain distortions and greatly simplify the foreground/background separation process. Although the foreground/background separation algorithm does not assume a perfect distortionless signal, a good physical model, such as the CHI color space representation noted earlier, is beneficial. This document will refer to the smallest spatial quanta of a spatio-temporal signal as a pixel, without narrowing its scope to just three-component color or grayscale imagery. Furthermore, without any loss of generality, assume that a vector quantization process in line with the aforementioned sensor model maps a multi-dimensional signal value for a pixel to a scalar integer. The vector quantization need not necessarily be a lossy quantization scheme, although a properly designed lossy quantization mechanism can dramatically reduce storage requirements and computational complexity of subsequent processing. Each generator is indexed by its corresponding vector quantization integer. Similarly, a Markov generator chain is represented by a temporally ordered set of integers. The causal Bayesian inference formulation is based on the Markov generator model. Both are described below.

The following notation will be used in the derivation of the discriminant functions:

| | | |
|---|---|---|
| $\omega \in \Omega \triangleq$ {Bg, Fg} | A label indicating whether a given pixel is foreground or background | (1) |
| $\gamma_{Bg}$ | Background discriminant function | |
| $\gamma_{Fg}$ | Foreground discriminant function | |
| $\mathcal{G}_{i,n}$ | Generator i at the nth time increment | |
| $\mathcal{R}$ | Regional (spatial locale) identifier (could refer to a single pixel or a collection of pixels) | |
| $\overline{u}_i$ | Binary indicator (or selection) vector denoting the ith generator | |
| $A_n$ | Markov model's generator transition matrix at the nth time increment | |
| $A_{n,\mathcal{R}}$ | Markov model's generator transition matrix in region $\mathcal{R}$ at the nth time increment | |

One preferred form of the foreground/background separator 140 computes for each element of the spatio-temporal signal $s_q(x_q,y_q,n)$ two discriminant functions $\gamma_{Bg}$ and $\gamma_{Fg}$. The former is a measure related to the likelihood that the element is part of the background, and the latter is a measure related to the likelihood that the element is part of a foreground object. The Markovian-Bayesian formulation for the discriminant functions $\gamma_{Bg}$ and $\gamma_{Fg}$ is given by the joint probability of the ith generator at time increment n, the jth generator at the previous time increment, and the background or the foreground. This, by way of Bayes' Rule, is equal to the three-term product of (i) the conditional probability of the ith generator at time increment n, given the jth generator at the previous time increment and the foreground or background-and-region, (ii) the conditional probability of the jth generator at the previous time increment, given the foreground or the background-and-region, and (iii) the prior probability of background or foreground. As mentioned previously, background generators are region-dependent, whereas foreground generators are spatially global. Consequently, the only region-dependent aspect of the foreground discriminant function expression is the prior probability of a foreground object, given the region $\mathcal{P}_{Fg|\mathcal{R}}$. The discriminant function expressions follow:

$$\gamma_{Bg} \triangleq \mathcal{P}_{\mathcal{G}_{i,n}, \mathcal{G}_{j,n-1}, Bg|\mathcal{R}} \quad (2)$$
$$= \mathcal{P}_{\mathcal{G}_{i,n}|\mathcal{G}_{j,n-1}, \mathcal{R}, Bg} \cdot \mathcal{P}_{\mathcal{G}_{j,n-1}|\mathcal{R}, Bg} \cdot \mathcal{P}_{Bg|\mathcal{R}}$$
$$= \overline{u}_i^T A_{n,\mathcal{R}} \overline{u}_j \cdot \overline{u}_j^T B_{n,\mathcal{R}} \cdot (1 - \kappa_{n,\mathcal{R}})$$

$$\gamma_{Fg} \triangleq \mathcal{P}_{\mathcal{G}_{i,n}, \mathcal{G}_{j,n-1}, Fg}$$
$$= \mathcal{P}_{\mathcal{G}_{i,n}|\mathcal{G}_{j,n-1}, Fg} \cdot \mathcal{P}_{\mathcal{G}_{j,n-1}|Fg} \cdot \mathcal{P}_{Fg|\mathcal{R}}$$
$$= \overline{u}_i^T A_n \overline{u}_j \cdot \overline{u}_j^T B_n \cdot \kappa_{n,\mathcal{R}}$$

Note that the binary indicator vector for the ith generator is $$\overline{u}_i \triangleq \begin{bmatrix} u_1 = 0 \\ \vdots \\ u_i = 1 \\ \vdots \\ u_N = 0 \end{bmatrix}, \quad (3)$$

the Markov model's generator transition matrix is $$A \triangleq \begin{bmatrix} \alpha_{1|1} & \alpha_{1|2} & \cdots & \alpha_{1|N} \\ \alpha_{2|1} & \ddots & \vdots & \vdots \\ \vdots & \vdots & \ddots & \vdots \\ \alpha_{N|1} & \alpha_{N|2} & \cdots & \alpha_{N|N} \end{bmatrix}, \quad \sum_{i=1}^{N} \alpha_{i|j} = 1; \forall (i,j): \alpha_{i|j} \geq 0, \quad (4)$$

and the generators' prior probabilities are expressed by the "beta vector"

$$B \triangleq \begin{bmatrix} \beta_1 \\ \beta_2 \\ \vdots \\ \beta_N \end{bmatrix}, \quad \sum_{i=1}^{N} \beta_i = 1; \forall i : \beta_i \geq 0 \qquad (5)$$

$$\mathcal{P}_{G_{i,n}|\ldots} = \mathcal{P}_{G_{i,n-1}|\ldots} = \dot{u}_i^T B$$

$$\mathcal{P}_{Bg|R} = 1 - \mathcal{P}_{Fg|R} \qquad (6)$$

$$\mathcal{P}_{Fg|R} \triangleq \kappa_R, \quad 0 \leq \kappa_R \leq 1$$

The preceding equations employ a Bayesian probabilistic framework to characterize the Markovian manner in which the "signatures" of the foreground objects and background in the spatio-temporal signal change over time.

Using the causal inference model, one can derive the following maximum a posteriori (MAP) decision rule for foreground/background separation:

$$\underbrace{\frac{\mathcal{P}_{G_{i,n}|G_{j,n-1},R,Bg}\mathcal{P}_{G_{j,n-1}|R,Bg}\mathcal{P}_{Bg|R}}{\gamma_{Bg}}}_{} \qquad (7)$$

$$\overset{Background}{\underset{Foreground}{\gtrless}} \underbrace{\frac{\mathcal{P}_{G_{i,n}|G_{j,n-1},Fg}\mathcal{P}_{G_{j,n-1}|Fg}\mathcal{P}_{Fg|R}}{\gamma_{Fg}}}_{}$$

where the probability terms are defined as follows:

| | |
|---|---|
| $\mathcal{P}_{G_{i,n}|G_{j,n-1},R,Bg}$ | Probability of ith generator at nth time increment, given the jth generator at the previous time increment and a specific background region |
| $\mathcal{P}_{G_{i,n}|G_{j,n-1},Fg}$ | Probability of ith generator at nth time increment, given the jth generator at the previous time increment and the aggregate foreground |
| $\mathcal{P}_{G_{j,n-1}|R,Bg}$ | Probability of jth generator at previous time increment, given a specific background region |
| $\mathcal{P}_{G_{j,n-1}|Fg}$ | Probability of jth generator at previous time increment, given the aggregate foreground |
| $\mathcal{P}_{G_{i,n}|R,Bg}$ | Probability of ith generator at nth time increment, given a specific background region |
| $\mathcal{P}_{G_{i,n}|Fg}$ | Probability of ith generator at nth time increment, given aggregate foreground |
| $\mathcal{P}_{Bg|R}$ | Prior probability of background for a specific region |
| $\mathcal{P}_{Fg|R}$ | Prior probability of foreground for a specific region |

For each of the probability measures listed above, the difference between those for the background and those for the foreground is only that each of the background measures is defined for a specific local region, whereas the foreground measures are, but for the exception of the foreground prior for a specific region, defined over the entire spatial domain. This reflects the fact that background is geographically fixed, whereas foreground objects are able to move over the entire spatial domain. Thus, their parameterization is identical except for the extent of spatial validity of the measures. Note also that in the formulation of Equation (7) enforces the domain constraint that the foreground generator distributions are not region dependent—again, but for the localization of a foreground object captured in the prior probability $\mathcal{P}_{Fg|R}$ Not all applications require the explicit modeling of the Markov generator chain. For those applications where modeling the spatial ordering of generators is sufficient to partition the space into foreground and background, one can use the following alternative MAP decision rule:

$$\underbrace{\mathcal{P}_{G_{i,n}|R,Bg}\mathcal{P}_{Bg|R}}_{\gamma_{Bg}} \overset{Background}{\underset{Foreground}{\gtrless}} \underbrace{\mathcal{P}_{G_{i,n}|Fg}\mathcal{P}_{Fg|R}}_{\gamma_{Fg}} \qquad (8)$$

The simpler formulation in equation (8) does not capture the temporal ordering of a sequence of generators that is built into equation (7). Environments with periodic variations in lighting and other uninteresting periodic phenomena will benefit from the full power of equation (7). For many outdoor applications, equation (8) is sufficient. Although the non-Markovian formulation does not capture temporal order, it efficiently models a multiplicity of generators within any given region. The non-Markovian formulation can be considered as the full Markovian formulation wherein all temporal transitions from one generator to another are assumed equally probable. In other words, a non-Markovian model for computing the discriminant functions $\gamma_{Bg}$ and $\gamma_{Fg}$ results when the generator transition matrix is the identity matrix ($A_{n,R}=I$) in Equation (2). The expression in equation (8) then simplifies to $$\gamma_{Bg} \triangleq \vec{u}_i^T B_n \mathcal{R} \ (1 - \kappa_n \mathcal{R})$$

$$\gamma_{Fg} \triangleq \vec{u}_i^T B_n \kappa_n \mathcal{R} \qquad (9)$$

The discriminant functions for foreground/background separation $\gamma_{Bg}$ and $\gamma_{Fg}$ have explicit probabilistic interpretations whether the Markovian or the non-Markovian formulation is used. Although the discriminant functions begin as strict probability measures, the feedback from higher-level processes force the measures to evolve to a more compact and efficient discriminator. The evolved measure no longer necessarily reflects a probability in its strict sense but tends to be just as effective, if not more.

Other definitions of the discriminant functions $\gamma_{Bg}$ and $\gamma_{Fg}$ are possible. In general, some or all of the parameters of the discriminant functions $\gamma_{Bg}$ and $\gamma_{Fg}$ are determined or adapted according to an adaptation or learning algorithm, as explained in greater detail below. In the case of the Markovian formulation expressed in Equations (2), the parameters are A, B, and κ; in the non-Markovian formulation expressed in Equation (9), the parameters are B and κ.

After calculating the discriminant functions $\gamma_{Bg}$ and $\gamma_{Fg}$ for a given element in the spatio-temporal signal $s_q(x_q,y_q,n)$, the foreground/background separator 140 compares them and makes a determination whether the element is foreground or background, according to the following decision rule:

$$\gamma_{Bg} \overset{Background}{\underset{Foreground}{\gtrless}} \gamma_{Fg} \qquad (10)$$

On the basis of that decision rule, the foreground/background separator 140 generates a label w (either foreground or background) for the element. That is repeated for each element in the spatio-temporal signal $s_q(x_q,y_q,n)$. The foreground/background labels ω are preferably organized in the form of a segmentation map, which has the same range as the spatio-temporal input signal $s_q(x_q,y_q,n)$ but has a binary domain Ω, as implied by Equation (7). In other words, the segmentation map $\omega(x_q,y_q,n)$ is a spatio-temporal signal, just like $s_q(x_q,y_q,n)$. It labels each element of $s_q(x_q, y_q, n)$ as either foreground or background.

A regional element $\mathcal{R}$, or the unit region, may be as small as an individual pixel or as large as the entire image at a given time. A preferred element size is a three-by-three square block of pixels. Other element sizes, including non-square sizes, are possible.

The symbol ω is used as shorthand for the foreground/background, spatio-temporal labeling ω($x_q$,$y_q$,n). The labels ω determined by the foreground/background separator 140 are input to the spatial grouper 150. Using connected components (e.g., regional elements) analysis, the spatial grouper 150 identifies contiguous foreground-labeled elements and associates them together as a single foreground object.

The objects can then be passed to the object classifier 160. Generally, the object classifier 160 classifies each foreground object as one of a number of types. Examples of possible types include human, car, truck, and dog. Another possible type is an "unknown," to which all objects not belonging to another type are classified. Some object types may be "of interest"; others may not. In one preferred form of the system 100, a temporal tracker 155 is situated between the spatial grouper 150 and the object classifier 160. The temporal tracker 155 implements a tracking mechanism and a classification history for each object in order to track objects over time; it aggregates the classification history to provide a more confident classification. Although the temporal tracker 155 is optional, it is advantageous, as objects of interest tend to persist in a scene for some span of time. The tracking mechanism delineates each object in a scene by its tightest fitting rectangle and fits a motion model to each object. The motion model may be linear, and may be adaptively modified by an algorithm, such as the recursive least squares (RLS) algorithm.

The tracking mechanism can be based on the same generator model used for foreground/background separation. It begins by forming a set of all objects in the environment (including interesting and uninteresting objects) and decomposing the global distribution $\mathcal{P}_{G_{i,n}|Fg}$ of foreground object-conditional generator probabilities into a sum, across all foreground objects, of joint generator-foreground-object probabilities:

$$\mathcal{P}_{G_{i,n}|Fg} = \sum_{\forall k} \left[ \left( \frac{\lambda_k}{\sum_{\forall l} \lambda_l} \right) \mathcal{P}_{G_{i,n}|Obj_k} \right] \quad (11)$$

$$\underbrace{\phantom{\frac{\lambda_k}{\sum \lambda_l}}}_{\mathcal{P}_{Obj_k|Fg}}$$

$$\Rightarrow \mathcal{P}_{G_{i,n}|Fg} = \sum_{\forall k} \left[ \mathcal{P}_{Obj_k|Fg} \mathcal{P}_{G_{i,n}|Obj_k} \right]$$

$$= \sum_{\forall k} \mathcal{P}_{G_{i,n},Obj_k|Fg}$$

The variable $\lambda_k$ in the above equation indicates the number of foreground pixels that corresponds to the $k^{th}$ object. Ideally, the probability distributions for each object are orthonormal with respect to each other, i.e., each object has a distinct generator signature. Often this is not true, but the most discriminative of generators are the most interesting. Thus, the relative entropy between two distributions could be used as a criterion to match them. Because the logarithmic terms involved in the computation of the relative entropy tend to be unnecessarily computationally intensive and unstable, the $L_1$ distance between two distributions is preferably used as the distance measure, as follows:

$$\langle \mathcal{P}_{G_n,Obj_k|Fg}, \mathcal{P}_{G_n,Obj_l|Fg} \rangle \triangleq \sum_{\forall i} \left| \begin{array}{c} \mathcal{P}_{Obj_k|Fg}\mathcal{P}_{G_{i,n}|Obj_k} - \\ \mathcal{P}_{Obj_l|Fg}\mathcal{P}_{G_{i,n}|Obj_l} \end{array} \right| \quad (12)$$

This distance measure is used by the temporal tracker 155, which distinguishes among objects by tracking the migration of their associated discriminative generators over space and time.

Combining the position and color information results in the following tracking algorithm:
(a) For each object identified at the previous time instance, predict its future location:
(i) Find a set of closest objects at the current time instance to the predicted location;
(ii) Set the maximum allowable distance from the predicted regional element to be a multiple of the object's largest dimension.
(b) For each object at the current time instance, determine its appearance distance based on its generator signature using equation (12) and reject any match with an appearance distance greater than a preset threshold.
(c) If both the object at previous time instance and current time instance declare each other as their best matches, then match the objects.
(i) Declare the objects as matched and remove them from further consideration;
(ii) Iterate until all mutually consenting objects are matched.
(d) Create a new target representation with a motion model and an appearance model for those objects that were not matched.
(e) Update the generator signature of each matched object for the next time increment (n+1) as follows:

$$\mathcal{P}_{G_{i,n+1}|Obj_k} = \frac{1}{\lambda_{k,n} + \eta\lambda_{k,n-1}} \left( \begin{array}{c} \lambda_{k,n}\mathcal{P}_{G_{i,n}|Obj_k} + \\ \eta\lambda_{k,n-1}\mathcal{P}_{G_{i,n-1}|Obj_k} \end{array} \right), \eta \in [0,1]; \quad (13)$$

$$\lambda_{k,n+1} = \lambda_{k,n}.$$

The constant η in the above update equation regulates the dependence of the generator signature on the previous appearance of the object. If η=0, then the object's signature only depends on the its appearance at the previous time instance. If η=1, then the object's signature depends on its entire history uniformly. Preferably, 0.75≦η≦0.999, most preferably η≈0.95.

Meanwhile, as objects are being tracked temporally, they are also being classified at each time increment by which the object classifier 160 operates. The result is a classification history for each object, as the classification for a given object may change over time. An output classification for an object is preferably determined on the basis of its classification history. For example, the classification most often given to an object throughout its history so far may be taken as the output classification. Finally, each object is denominated as either interesting or uninteresting based on its output classification.

The object-level information is then used to adjust the parameters of the foreground/background separator 140. According to one embodiment, this is done using a classifier-generated "true" or reference foreground/background label $\omega_{REF}$ for each element, determined according to the following three rules: (1) If an object is classified as an object of interest, set the reference label to foreground for every element that is a part of the object; (2) if an object is classified as not an object of interest, set the reference label to background for every element that is a part of the object; and (3) for all elements that are not a part of an object at all, set the reference label to background. The foreground/background separator 140 can then implement a adaptation or learning mechanism to adjust its parameter values so that its foreground/background labels better match the reference labels. This top-down adaptation is advantageous in that high-level classification context is used to improve the low-level segmentation of the image's foreground and background components. One technique for doing that adaptation or learning involves the maximization of a figure of merit function, which can be any function that measures how well the foreground/background separator 140 has predicted the reference foreground/background labels. A preferred figure of merit function is a risk/benefit/classification figure of merit (RBCFM) function $\sigma(\delta,\psi)$, which is defined and discussed in detail in U.S. Patent Application Publication No. US 2003/0088532 A1, the entirety of which is incorporated herein by reference (see, in particular, FIGS. 4 and 6, Equations (1)-(6), and pages 5-6). Use of an RBCFM results in risk differential learning, as explained in the above-referenced publication. A preferred formulation of the RBCFM function $\sigma(\delta,\psi)$ is as follows:

$$\sigma(L \cdot (\gamma_{Fg} - \gamma_{Bg}), \psi) \tag{14}$$

where $$L \stackrel{\Delta}{=} \begin{cases} 1 & \text{if } \omega_{REF} = Fg(\text{foreground}) \\ -1 & \text{if } \omega_{REF} = Bg(\text{background}). \end{cases} \tag{15}$$

Regardless how the figure of merit function is formulated, the adaptation or learning criteria is to maximize that function over all of the foreground/background separator 140 parameters or some subset of them. While various optimization strategies can be utilized to perform that maximization, a preferred strategy is gradient ascent. In the case of the RBCFM function $\sigma(\delta,\psi)$, gradient ascent is accomplished by iteration of the following equation:

$$\vec{\theta}(n+1) = \vec{\theta}(n) + \mu \cdot \nabla_\Theta \sigma(\delta,\psi) \tag{16}$$

where $\vec{\theta}$ is a vector of the adaptable parameters, $\mu$ is the step size, and $\nabla_\Theta$ is the gradient operator applied to the RBCFM function $\sigma(\delta,\psi)$ over the domain of $\vec{\theta}$. In the special case where $\delta = L \cdot (\gamma_{Fg} - \gamma_{Bg})$, as in Equation (15); $\vec{\theta}(n) = B_n$; $\gamma_{Fg}$ and $\gamma_{Bg}$ are computed according to the non-Markovian model, as in Equation (9); and $\kappa$ is not adaptable, then the gradient ascent iteration equation is as follows for each component $\beta_i$ of the vector B:

$$B_{n+1} = B_n + \mu \cdot \nabla_B \tag{17}$$

$$\Rightarrow \beta_i(n+1) = \beta_i(n) + \mu \frac{\partial \sigma}{\partial \beta_i}.$$

An analogous expression for the more complicated Markovian model of equations (2) is derived similarly, using $\vec{\theta}(n) = \{A_n, B_n\}$.

Because, the parameters $\beta$ are constrained to be positive and to sum to one (see Equation (4)), the gradient ascent algorithm preferably incorporates those constraints during each iteration as follows: (1) compute an updated value of $\beta_i$ according to Equation (18) above for all i; (2) if $\beta_i < 0$, set $\beta_i = 0$; and (3) normalize the set of updated values as follows:

$$\beta_i^{normalized} = \frac{\beta_i^{unnormalized}}{\sum_{j=1}^{N} \beta_j^{unnormalized}} \tag{18}$$

Alternatively, the constraint conditions expressed in steps (2) and (3) above can be enforced less frequently than every iteration, e.g., every third or every tenth iteration.

The inventors have discovered that this constrained gradient ascent algorithm is quite stable for a rather broad range of step size $\mu$. Preferably, $\mu \approx 0.3$ results in an acceptable convergence rate with stability. The step size $\mu$ itself may be adaptable or time-varying.

In cases of spatio-temporal signals obtained from sensors with variable spatial acuity (e.g., optical sensors with pan, tilt, and zoom capabilities), it is possible to take into account changes in sensor acuity. First, as to zoom, one defines, as a design choice, a unit region R on the spatial domain of the signal $s_q(x_q, y_q, n)$. Preferably, R is a three-by-three block. Based on that unit region, a scale pyramid can be defined as follows:

$$\mathcal{R}^2 \stackrel{\Delta}{=} \begin{bmatrix} \mathcal{R} & \mathcal{R} & \mathcal{R} \\ \mathcal{R} & \mathcal{R} & \mathcal{R} \\ \mathcal{R} & \mathcal{R} & \mathcal{R} \end{bmatrix} \tag{19}$$

$$\mathcal{R}^3 \stackrel{\Delta}{=} \begin{bmatrix} \mathcal{R}^2 & \mathcal{R}^2 & \mathcal{R}^2 \\ \mathcal{R}^2 & \mathcal{R}^2 & \mathcal{R}^2 \\ \mathcal{R}^2 & \mathcal{R}^2 & \mathcal{R}^2 \end{bmatrix}$$

$$\mathcal{R}^s \stackrel{\Delta}{=} \begin{bmatrix} \mathcal{R}^{s-1} & \mathcal{R}^{s-1} & \mathcal{R}^{s-1} \\ \mathcal{R}^{s-1} & \mathcal{R}^{s-1} & \mathcal{R}^{s-1} \\ \mathcal{R}^{s-1} & \mathcal{R}^{s-1} & \mathcal{R}^{s-1} \end{bmatrix} = \begin{bmatrix} \mathcal{R}^s_{11} & \mathcal{R}^s_{12} & \mathcal{R}^s_{13} \\ \mathcal{R}^s_{21} & \mathcal{R}^s_{22} & \mathcal{R}^s_{23} \\ \mathcal{R}^s_{31} & \mathcal{R}^s_{32} & \mathcal{R}^s_{33} \end{bmatrix}$$

Equation (19) stipulates that at all scales above the first, the block $\mathcal{R}^s$ at the specified scale comprises a three-by-three set of blocks from the next lower scale $\mathcal{R}^{s-1}$. Equation (19) further establishes the spatially ordered block subscripting convention used below in equation (20). A region at decimation level s occupies an area with dimensions $3^s \times 3^s$, measured on the scale of the signal $s_q(x_q, y_q, n)$. Recursively, the distribution $\mathcal{P}_{\mathcal{G}_{k,n}|\mathcal{R},Bg}$ is specified as follows:

$$\mathcal{P}_{\mathcal{G}_{k,n}|\mathcal{R}^s,Bg} = \frac{1}{9} \sum_{i=1}^{3} \sum_{j=1}^{3} \mathcal{P}_{\mathcal{G}_{k,n}|\mathcal{R}^s_{i,j},Bg} \tag{20}$$

$$\mathcal{P}_{\mathcal{G}_{k,n}|\mathcal{R}^{s-1}=\mathcal{R}^s_{i,j},Bg} = \frac{1}{9} \sum_{l=1}^{3} \sum_{m=1}^{3} \mathcal{P}_{\mathcal{G}_{k,n}|\mathcal{R}^{s-1}_{l,m},Bg}$$

$$\vdots$$

At the maximum decimation level $s_{max}$, the region occupies the entire image and $\mathcal{P}_{\mathcal{G}_{k,n}|\mathcal{R}^{s_{max}},Bg} = \mathcal{P}_{\mathcal{G}_{k,n}|Bg}$. Thus, at the highest decimation level, both the foreground and the background discriminant functions share global relevance. In order to maximize detection performance it is typically advisable to operate at some intermediate decimation level. The inventors have empirically found s=2 to be a reliable number. It is also possible to craft an algorithm to automatically choose the decimation level.

Sensor motion can affect the causal model of the spatio-temporal signal. Specifically, the region dependence of the conditional likelihood term $\mathcal{P}_{G_{i,n}|G_{i,n-1},R,Bg}\mathcal{P}_{G_{i,n-1}|R,Bg}$ in Equation (7) can no longer be easily estimated. Sensor motion can take two forms: (1) predictable and periodic; or (2) unpredictable. The causal inference model in equation (7) is valid for predictable and/or periodic sensor motion. With an appropriate choice of a spatial decimation level, s, the generator model is fully capable of capturing a time varying background model. Predictable and periodic sensor motion is also one of those scenarios wherein explicit modeling of the Markov generator chain offers significant discriminative advantages. Unpredictable sensor motion presents a challenge that can still be handled by the causal inference model, but requires some additional algorithmic machinery. Moreover, unpredictable sensor motion also places some constraints on the detection capabilities of the algorithm. Specifically, the sensor should remain stationary while the system learns its initial foreground and background discriminant functions. Further constraints depend on whether or not the sensor motion is measurable. Measurable sensor motion involves an external process that deterministically computes the motion and transforms it to pixel coordinates. In other words, the pan and tilt of the sensor can be transformed to $\Delta x$ and $\Delta y$ translations of the signal and zoom can be translated to a scaling of the signal. Immeasurable sensor motion can only be estimated indirectly via the observed change in the spatio-temporal signal. If sensor motion can be measured, then the region dependence of the background discriminant can be computed deterministically from the previously inferred model, and the causal inference paradigm continues to be the same after the regions are appropriately remapped. In other words, given a remapping function $\gamma(R)$, the following decision rule applies:

$$\underbrace{\mathcal{P}_{G_{i,n}|Y,Bg}\mathcal{P}_{Bg|Y(R)}}_{\gamma_{Bg}} \overset{Background}{\underset{Foreground}{\gtrless}} \underbrace{\mathcal{P}_{G_{i,n}|Fg}\mathcal{P}_{Fg|Y(R)}}_{\gamma_{Fg}} \quad (21)$$

If the computational budget for estimating sensor motion exists and a calibration process can be executed before the system is operational, then the remapping function $\gamma(R)$ can be estimated. Often, an online estimation of the remapping function is not computationally feasible and a calibration process is not practical. In that case, removing the regional dependence of the background discriminant function results in the decision rule taking the following form:

$$\underbrace{\mathcal{P}_{G_{i,n}|Bg}\mathcal{P}_{Bg|Y(R)}}_{\gamma_{Bg}} \overset{Background}{\underset{Foreground}{\gtrless}} \underbrace{\mathcal{P}_{G_{i,n}|Fg}\mathcal{P}_{Fg|Y(R)}}_{\gamma_{Fg}} \quad (22)$$

$$\mathcal{P}_{Bg|Y(R)} = \mathcal{P}_{Fg|Y(R)} = 0.5$$

Assuming that the system is notified when the sensor is in motion and when it is stationary, an algorithm for dealing with the case in which the sensor is in motion and there is no way to measure or estimate the motion is as follows:

(1) Assume that the sensor is stationary when the system starts and the foreground and background discriminant can be estimated.
(2) If the system is notified that the sensor is in motion:
    (a) Use equation (20) to recompute the region-independent background discriminant by setting the decimation level to its maximum, $s_{max}$;
    (b) Recompute the foreground discriminant using equation (11) with (2) or (9).
(3) If the system is notified that the sensor is stationary, revert back to the standard background and foreground discriminants.
(4) Proceed with the foreground/background separation process as before.

Note that once the sensor is in motion, the algorithm continues to detect foreground objects that were in the scene while the sensor was stationary. New objects that have a similar chromatic signature as previously detected objects also are detected. Thus, for immeasurable and unpredictable sensor motion the algorithm is useful in scenarios where the sensor is tracking a particular set of objects in the scene.

Figure 2:
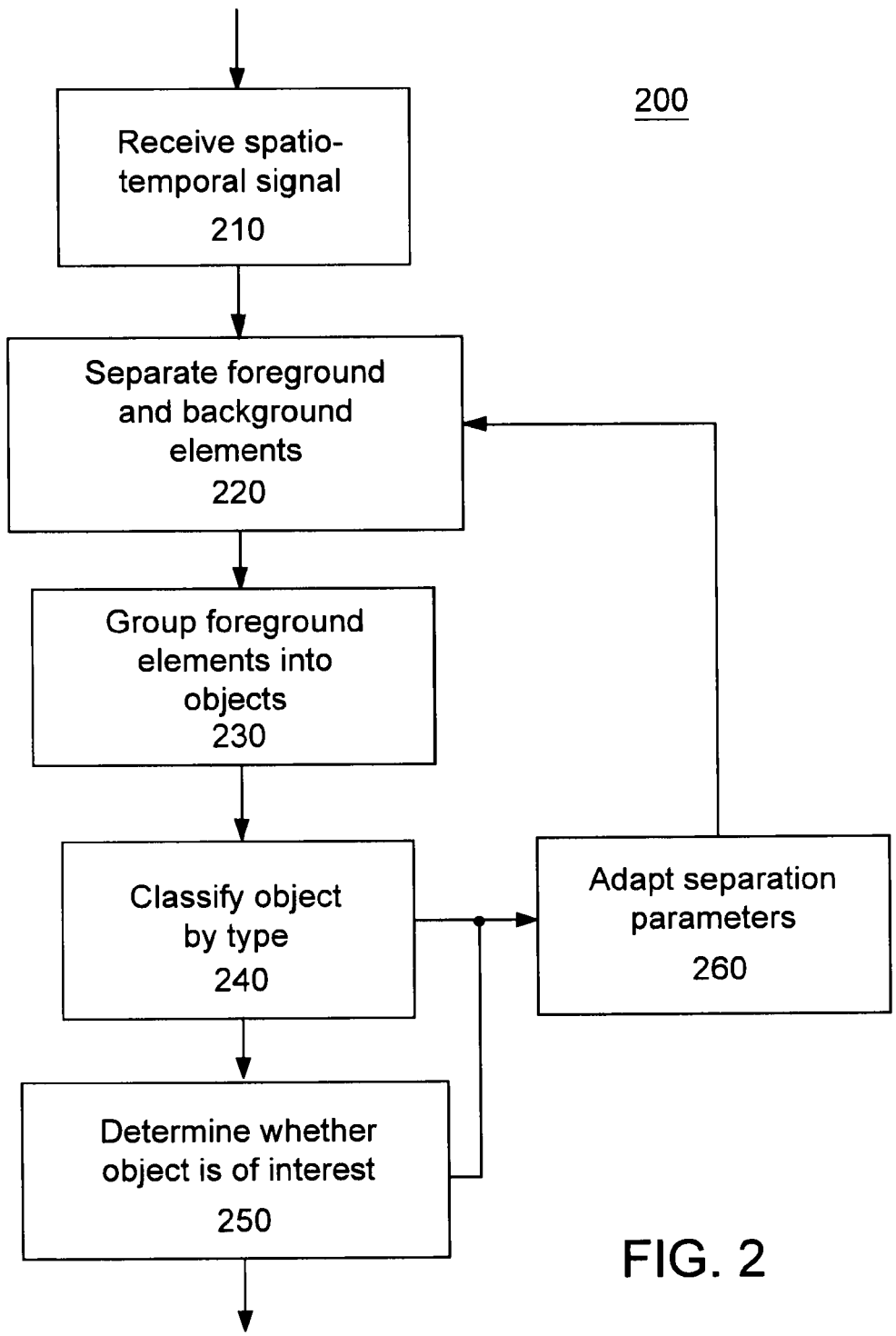
FIG. 2 is a flowchart of an object detection method according to one embodiment.

FIG. 2 is a top-level flowchart of an object detection method 200 according to one embodiment. The method 200 may be implemented, for example, by the system 100. The method 200 begins by receiving (210) a spatio-temporal signal. Next, the method 200 separates (220) the elements of the spatio-temporal signal into foreground and background categories. Next, the method 200 groups (230) connected foreground elements as foreground objects. The method 200 then classifies (240) foreground objects by type. Finally, the method 200 determines (250) whether a given foreground object is interesting or not. The classifying step 240 and the determining step 250 generate object-level information (e.g., object types), which the method 200 utilizes to adapt (260) the parameters governing the operation of the separating step 220. Details for particular implementations of the steps of the method 200 are described in the following paragraphs and illustrated in the subsequent drawings.

Figure 3:
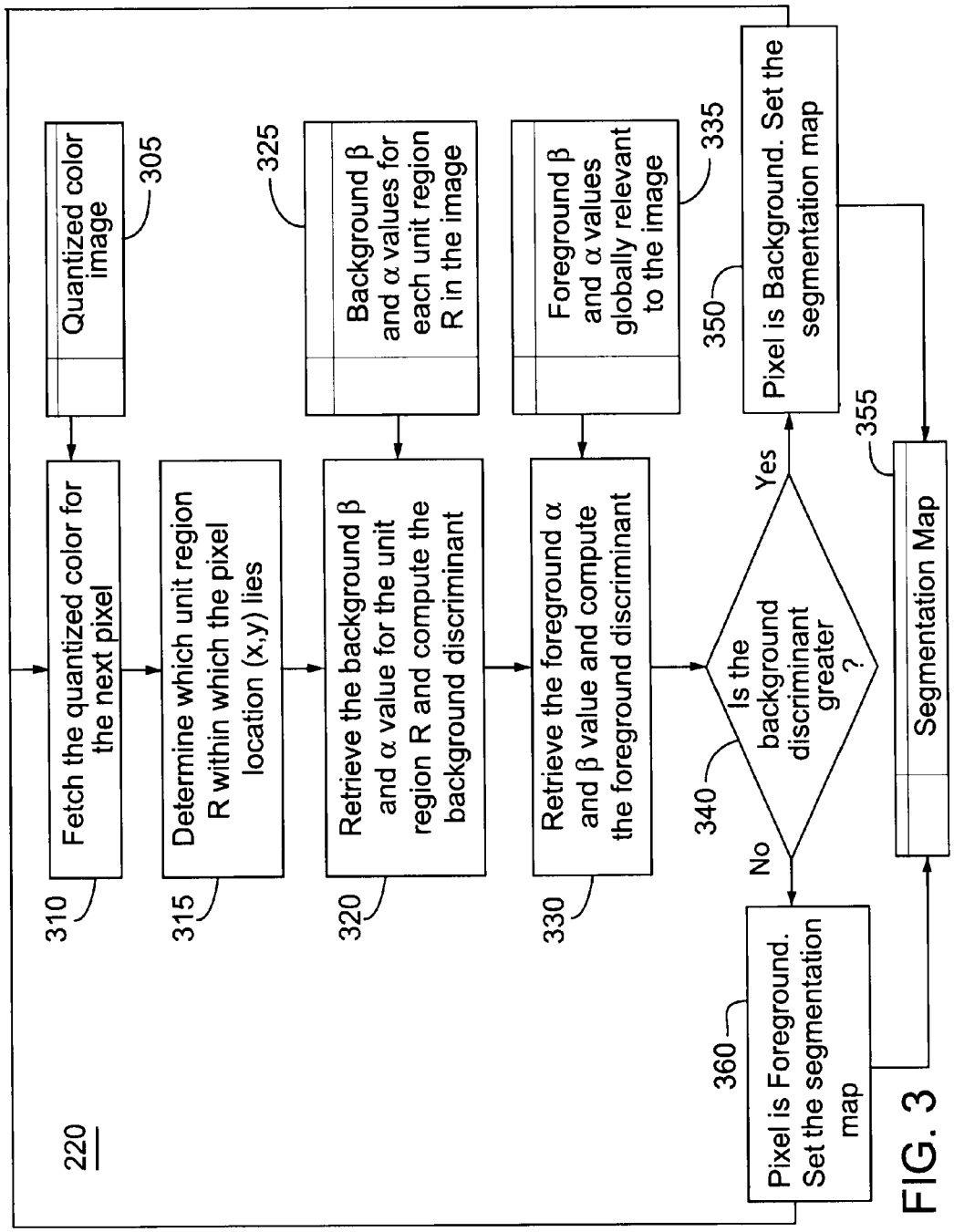

FIG. 3 is a flowchart of details of the foreground/background separating step 220. The separating step 220 refers to a quantized color image 305, which is the spatio-temporal signal $s_q(x_q,y_q,n)$ at a fixed time, and thus a still image, in which the elements are quantized to a discrete integer value. The separating step 220 fetches (310) a quantized value associated with an pixel. Each pixel $(x_q,y_q)$ falls within a unit region R, within which all pixels share the same background generators and discriminant parameters. The separating step 220 determines (315) which unit region R within which the pixel lies, retrieves (320) the background discriminant parameters ($\alpha$ an $\beta$) 325 for that unit region R, and computes (320) the background discriminant $\gamma_{Bg}$ using the parameters 325. The separating step 220 also retrieves (330) the foreground generators and discriminant parameters ($\alpha$ an $\beta$) 335, which are globally relevant to the entire image, rather than unique to each unit region, and computes (330) the foreground discriminant $\gamma_{Bg}$ using the parameters 335. Having computed both $\gamma_{Fg}$ and $\gamma_{Bg}$, the separating step 220 compares (340) them. If the foreground discriminant is greater, the separating step 220 sets (350) a corresponding element of the segmentation map 355 to indicate foreground; otherwise, it sets (360) the corresponding element of the segmentation map 355 to indicate background. The separating step 220 is repeated for each pixel of the quantized color image 305. After all locations have been separated in this manner, the segmentation map 355 can be used to determine the foreground/background label associated with each pixel in the quantized color image 305, as the segmentation map 355 is a binary image storing the foreground/background labels for the image.

Figure 4:
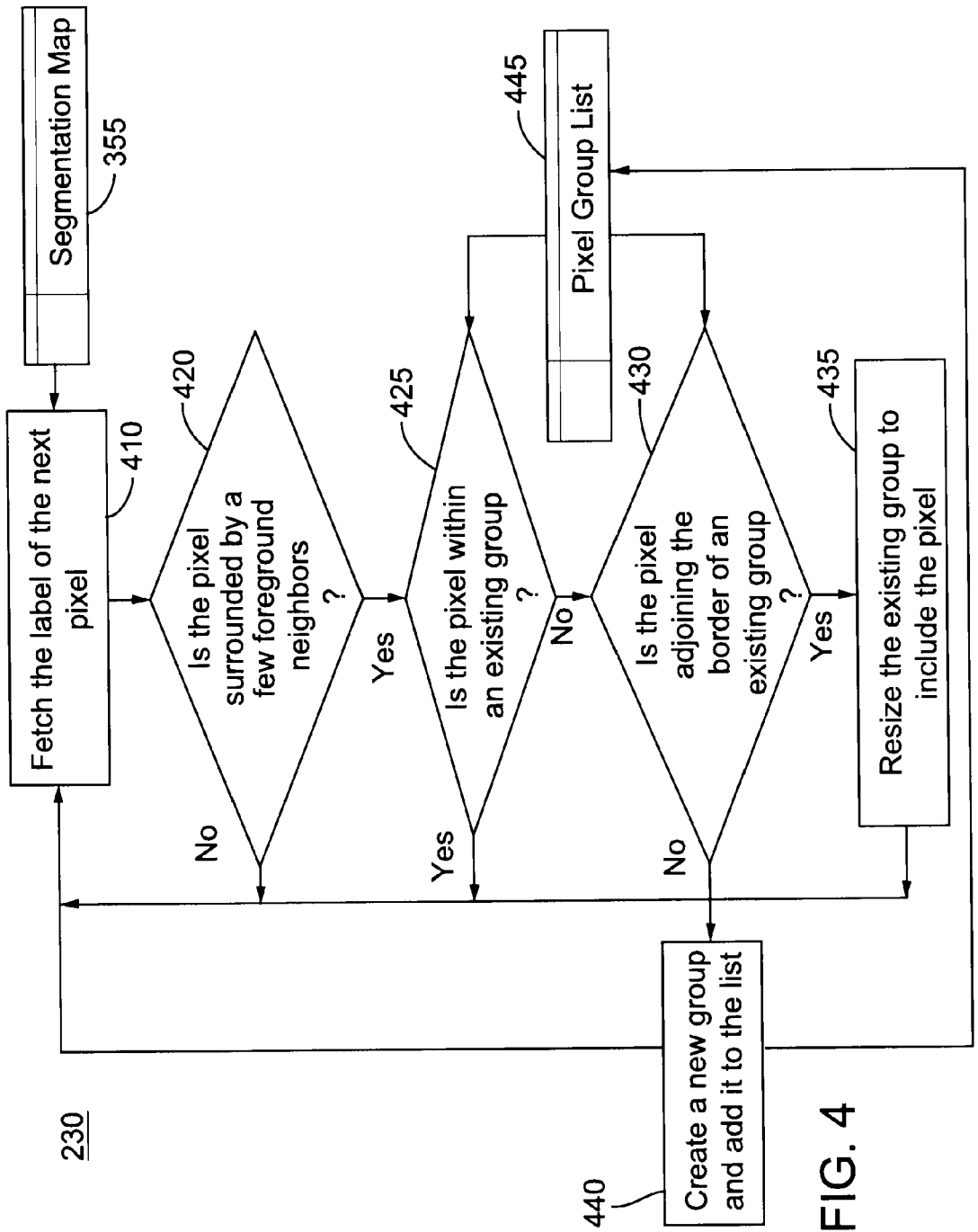

FIG. 4 is a flowchart of details of a particular implementation of the grouping step 230 of the method 200. The objective of the grouping step 230 is to delineate all distinct foreground regions in the image with a tight rectangular boundary. The grouping step 230 utilizes the segmentation map 355 generated by the separating step 220. For each pixel of the segmentation map 355, the grouping step 230 fetches (410) the foreground/background label associated with the pixel and determines (420) whether the pixel under consideration adjoins a few foreground-labeled neighbors. The inventors have empirically determined that at least three neighboring pixels should be labeled as foreground to constitute a foreground object. In other words, isolated individual foreground pixels or isolated adjacent pairs of foreground pixels should be ignored. The testing step 420 can be a standard erosion and dilation operation. If the result of the testing step 420 is negative, the grouping step 230 discounts the foreground label for the location under consideration and continues with the next element in the image by returning to the fetching step 410. If the result of the testing step 420 is affirmative, the grouping step 230 tests (425) whether the element is part of an existing group, which is a tight rectangular region around a set of foreground pixels. If so, the pixel is already part of a delineated foreground region and the grouping step 230 also returns to the fetching step 405. If not, the grouping step tests (430) whether the pixel borders an existing group. If so, the grouping step 230 resizes (435) that group to include the pixel under consideration. Because the groups preferably have a rectangular shape and enclose as tightly as possible their member elements, the resizing operation expands the rectangle by one increment in the direction of the newly included element. If the element does not border an existing group, a new group is created (440). The grouping step 230 preferably maintains the group association information as a pixel group list 445, which is utilized by other steps.

FIG. 5 is a flowchart of further details of a particular implementation of the classifying step 240 of the method 200. This implementation constructs (510) a match table to separate known and unknown objects. A known object is one that can be corresponded with one seen at a previous time instance. An unknown object is one that is new to the scene. As part of this process, the classifying step 240 simultaneously segments, classifies, and corresponds (520) known targets. Next, it segments and classifies (530) new objects. Finally, it updates (540) the object's state information (e.g., its motion model and color histogram) and adapts (540) the predictive model embodied in the parameters of the foreground/background separation step 220. FIGS. 6-9 elaborate on the steps 510-540, respectively.

FIG. 6 is a flowchart of one implementation method 600 of the match table construction step 510, shown in FIG. 5. Referring to the element group list 445, the method 600 iteratively fetches (610) each group in the list 445 and also fetches (620) each target agent from an object agent list 625, which is a list of data structures containing a particular object's state information, such as position, classification, motion model, and color histogram. Information contained within an object agent is accumulated over time as the object moves through the scene. The method 600 tests (628) whether all object agents have been considered for a particular pixel group. If so, the method 600 moves on to the next pixel group. If not, the method 600 computes (630) the Euclidean distance between the center of the pixel group and the center of the predicted position of the object modeled by the motion model in the object agent. The method 600 then tests (640) whether the group is close to the target agent. A threshold on the maximum allowable Euclidean distance defines closeness. If the object modeled by the object agent is not close enough, the method 600 returns to the fetching step 620 and repeats the test for the next object agent in the list. If the object is close enough, the method 600 adds (630) the object agent to a probable match list for that group and adds the group to a probable match list for that target agent. The two match lists can be sorted by distance of a group from an object.

Figure 7:
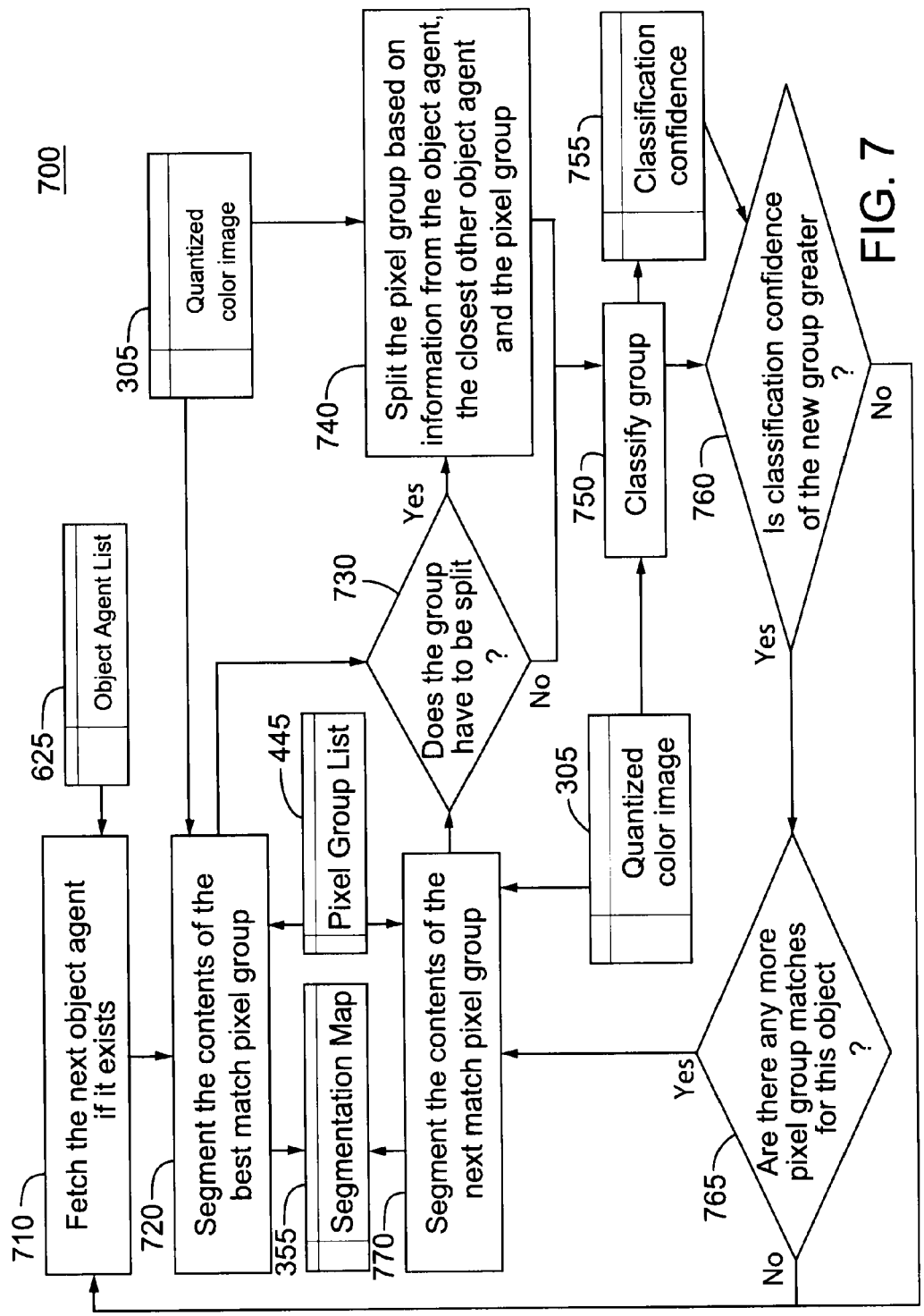

FIG. 7 is a flowchart of one implementation method 700 of the step 520, shown in FIG. 5, for segmenting, classifying and corresponding known objects. The method 700 begins by fetching (710) an object agent from the object agent list 625 and segmenting (720) the contents of the corresponding best match group. The segmenting process uses the segmentation map 355 from the foreground/background separation step 220 and the object's color histogram (not shown), which is the object color information accumulated over time, to adjust the delineation of the pixel group such that it contains only the object in question. The objects' color histogram is used to eliminate those (ex.) locations in the pixel group labeled as foreground whose quantized color value does not appear in the histogram. Next, the method 700 tests (730) whether the group should be split. The decision to split depends on the size difference between the object and the best match pixel group. A threshold on the size (area) difference is preferably preset and determined empirically. The inventors have found that a threshold between about 1.4 and about 2.0 works well, with about 1.5 being a preferred value. If the pixel group should be split, the method 700 does so (740) based on information from the target agent, the closest other target agent, and the group itself. More specifically, the target agent's color histogram can horizontally and/or vertically split the group by comparing the frequency with which a particular quantized color is seen by the object under consideration and the next closest object to the pixel group under consideration. Regardless whether the group is split, the method 700 classifies (750) the group(s) and in the course of doing so generates a classification confidence 755, which is defined as the differential generated by the neural network classifier, as defined in the above-referenced U.S. Patent Application Publication No. US 2003/0088532 A1, e.g., the argument δ in the RBCFM function. Next, the method 700 tests (760) whether the classification confidence 755 of the new group is greater than the previous group segmented and classified with respect to the object under consideration. If the testing step 760 returns a negative result, the method 700 returns to the fetching step 710 to perform another iteration. If the result of the testing step 760 is affirmative, the method 700 repeats a segmenting step 770 (similar to the segmenting step 720), the splitting step 740, and the classifying step 750 for the next pixel group in the object's match list, if another pixel group exists in the list. If all the pixel groups in the list have been considered, the method 700 returns to the fetching step 710.

Figure 8:
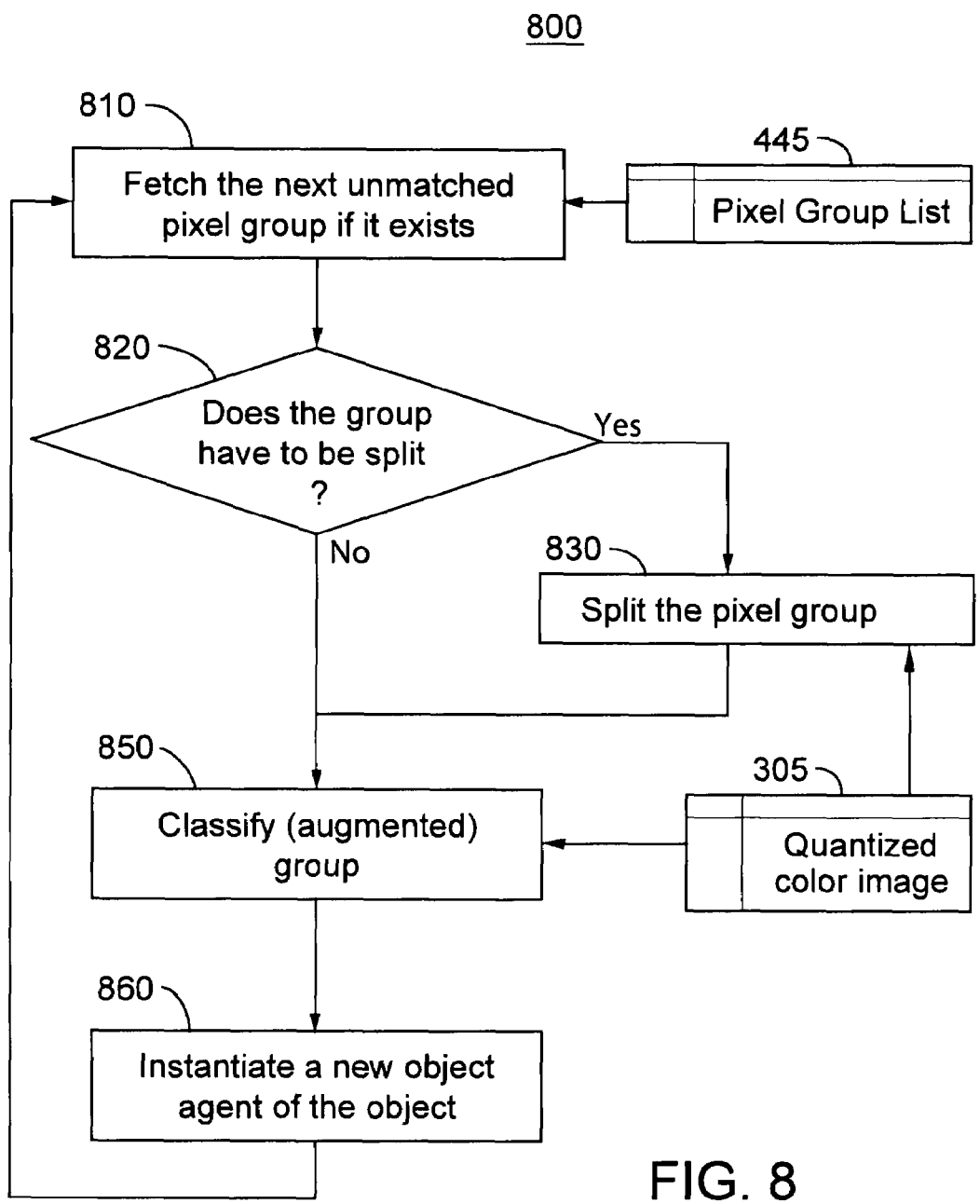

FIG. 8 is a flowchart of one implementation method 800 of the step 530, shown in FIG. 5, for segmenting and classifying new targets. Unlike known objects, new objects have not been observed previously in the scene. The method 800 begins by fetching (810) an unmatched group from the pixel group list 445 and testing (820) whether the group should be split. If so, it is split (830). Preferably, the splitting step 830 is based on vertical occupancy histograms associated with the group. A vertical occupancy histogram counts the number of foreground locations along the y-axis binned across each discrete x location within the pixel group. The splitting algorithm tries to identify distinct modes in the occupancy histogram with substantial separation (defined by a minimum threshold) along the x-axis. If such modes are discovered, the group is split vertically at the minimum histogram occupancy point between the modes. Whether it is split or not, the method 800 classifies (850) the group(s) and instantiates (860) a new object agent before returning to the fetching step 810 to iterate again.

Figure 9:
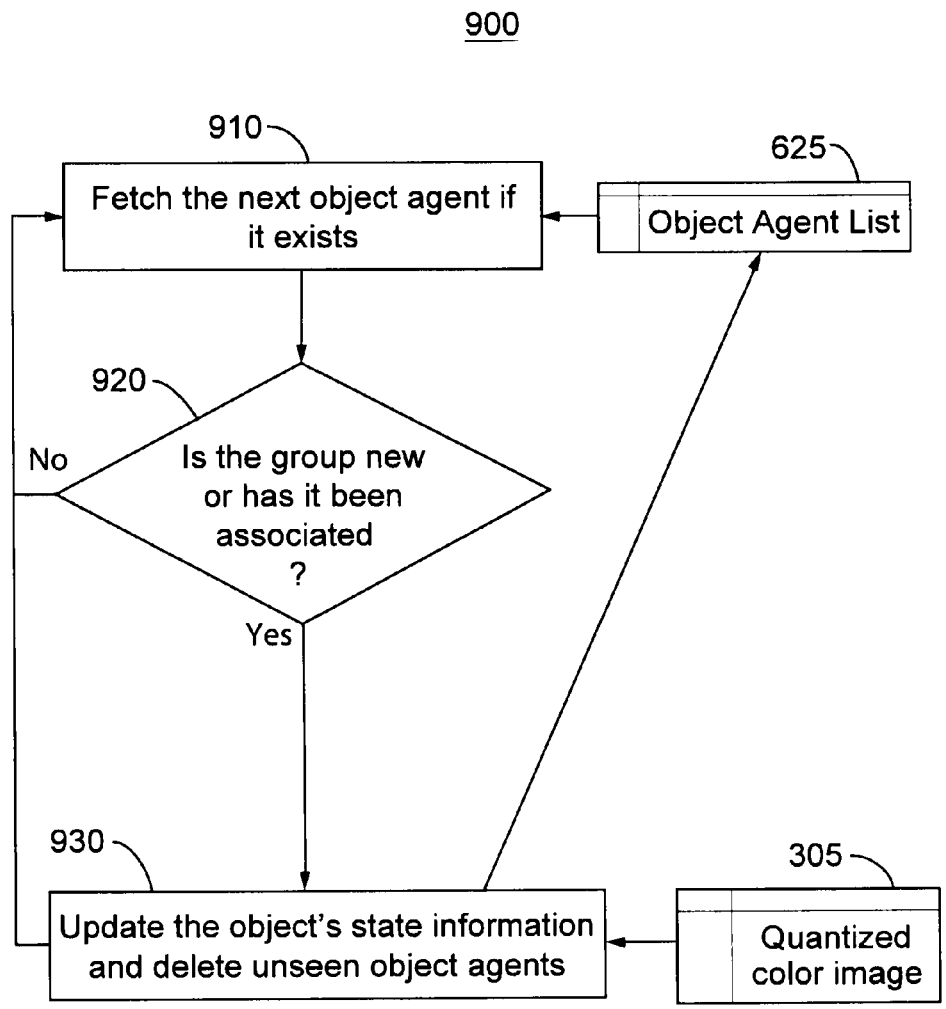

FIG. 9 is a flowchart of one implementation method 900 of the state information updating step 540, shown in FIG. 5. Referring to the object agent list 625, the method 900 fetches (910) a target agent and then tests (920) whether the corresponding group is new or associated to the object agent. If it has been associated, the method 900 follows the "no" path and returns to the fetching step 910 to iterate again. Otherwise, the method 900 updates (930) information about the target, such as its color histogram, position and velocity estimates, and finally its classification based on its historical information. The object's color histogram can be updated based on an exponential window, and position and velocity estimates can be updated using a motion prediction algorithm, such as a linear predictive filter. A class conditional histogram can be utilized to store historic information. The class conditional histogram counts the number of times the object was said to be of a particular class. For example, an object may have been classified as a person eight out of ten possible sightings of the object, and it may have been classified as an animal twice. The updating step 930 also deletes unseen target agents, such as targets absent from the spatio-temporal signal for a predefined number of frames.

FIG. 10 is a flowchart of one implementation method 1000 of the parameter adapting step 260 of the method 200. The method 1000 iteratively fetches (1005) the feedback value for a given element, based upon classifier feedback 1010 (i.e., object-level information); computes and accumulates (1015) the gradient associated with the element; and tests (1020) whether all gradient terms for all elements have been computed. When the gradient is fully computed, the method 1000 performs an iteration of gradient ascent for the parameters associated with both the foreground and background. Beginning first with the background as an arbitrary choice, the method 1000 fetches (1025) the background state information 1030 (the modifiable parameters $\beta$ and possibly $\alpha$ for a unit region) for the next unit region R, and tests (1035) whether any were fetched. If none were fetched, the background portion is done. Otherwise, the method 1000 tests (1040) whether it is time to update the background parameters. Updates can be performed at preset intervals for each region. If it is time for an update, the method 1000 performs (1045) one iteration of gradient ascent and normalizes (1050) (and check bounds for) the resulting parameters, such as by Equations (19). The method 1000 also performs steps 1060, 1065, and 1070 to update the foreground state information, similarly to the steps 1040, 1045, and 1050 just described.

The methods and systems illustrated and described herein can exist in a variety of forms both active and inactive. For example, they can exist as one or more software programs comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims, and their equivalents, in which all terms are to be understood in their broadest reasonable sense unless otherwise indicated.

The invention claimed is:

1. A method for processing a spatio-temporal input signal containing zero or more foreground objects of interest superimposed on a background, the method comprising:
   receiving, at a computer processor, data representing images captured by a camera, the computer processor performing one or more of:
     deriving the spatio-temporal input signal from the data, the spatio-temporal input signal comprising a number of elements;
     separating, according to one or more adaptable separation parameters, the elements of the spatio-temporal input signal into a foreground category or a background category;
     grouping selected foreground-categorized elements in the spatio-temporal input signal together as a foreground object, thereby resulting in zero or more foreground objects;
     generating object-level information related to the foreground objects; and
     adapting the one or more adaptable separation parameters on the basis of the object-level information.

2. The method of claim 1, wherein the spatio-temporal input signal represents a time-varying video image, and the selected foreground-labeled elements are spatially contiguous foreground-labeled elements.

3. The method of claim 1, wherein the object-level information comprises determinations whether each of the foreground objects is an object of interest.

4. The method of claim 1, wherein the spatio-temporal input signal is encoded using a CHI color representation, and the deriving step comprises:
   converting the data encoding color information using an RGB color representation to a CHI color representation.

5. The method of claim 1, wherein the spatio-temporal input signal contains data in a compressed form, and the deriving step comprises:
   compressing a relatively uncompressed spatio-temporal signal derived from the data to a compressed form.

6. The method of claim 5, wherein the compressing step comprises:
   performing a vector quantization algorithm.

7. The method of claim 1, wherein the elements of the spatio-temporal input signal are nine-by-nine blocks of pixels in an image at a given time.

8. The method of claim 1, wherein the foreground/background labels are organized in the form of a segmentation map corresponding to the spatio-temporal input signal at a given time.

9. The method of claim 1, wherein the separating step comprises:
calculating for each element in the spatio-temporal input signal a foreground discriminant function and a background discriminant function; and
activating, for each element, either a foreground label if an element's foreground discriminant function exceeds its background discriminant function or a background label if its background discriminant function exceeds its foreground discriminant function.

10. The method of claim 9, wherein the one or more adaptable parameters are parameters of the foreground discriminant function or the background discriminant function.

11. The method of claim 9, wherein the foreground discriminant function and the background discriminant function are based on a Markovian model of the spatio-temporal input signal.

12. The method of claim 9, wherein the separating step further comprises:
maximizing a figure of merit function based in part upon the object-level information determined by the classifying step.

13. The method of claim 12, wherein the figure of merit function is a risk benefit figure of merit function.

14. The method of claim 13, wherein the risk benefit figure of merit function is of the form $\sigma(L \cdot (\gamma_{Fg} - \gamma_{Bg}), \psi)$ where $\gamma_{Fg}$ and $\gamma_{Bg}$ are the foreground and background discriminant functions respectively, $L=+1$ if the element is a part of a foreground object of interest or $L=-1$ otherwise, and $\psi$ is a confidence parameter.

15. The method of claim 12, wherein the maximizing step comprises:
adapting the one or more adaptable parameters of the foreground discriminant function or the background discriminant function so as to attempt to maximize the figure of merit function.

16. The method of claim 15, wherein the adapting step comprises:
performing a gradient ascent algorithm.

17. The method of claim 16, wherein gradient ascent algorithm is constrained by the conditions that the one or more adaptable parameters are positive and normalized.

18. The method of claim 1, wherein the generating object-level information step comprises:
temporally tracking objects over time.

19. The method of claim 18, wherein the generating object-level information step comprises:
classifying current instances of an object; and
updating a classification history for the object.

20. The method of claim 19, wherein the object-level information comprises an object type, and the classifying step further comprises:
assigning an object its most likely type from a set of possible object types, based on the classification history of the object.

21. The method of claim 20, wherein the set of possible types includes a type for unknown objects.

22. The method of claim 20, wherein at least one of the possible types is a type of interest, and the adapting step comprises:
assigning object-level information to foreground/background label reference values for elements of the spatio-temporal signal, wherein a foreground/background label reference value for a given element is set to foreground if the element is part of an object assigned a type of interest, or the foreground/background label reference value for a given element is set to background if the element is not part of an object assigned a type of interest.

23. The method of claim 1, wherein the generating object-level information step comprises:
classifying objects by type according to a taxonomy of object types, and the object-level information comprises object type classification information.

24. The method of claim 1, wherein the spatio-temporal input signal contains one or more foreground objects of interest superimposed on the background.

25. The method of claim 1, wherein the camera has variable spatial zoom.

26. A non-transitory computer readable medium on which is embedded a program performing the method of claim 1.

27. A system for processing a spatio-temporal input signal containing zero or more foreground objects of interest superimposed on a background, the system comprising:
a camera producing data representing an image from which the spatio-temporal input signal is derived, the spatio-temporal input signal including an element; and
a foreground/background separation module receiving the spatio-temporal input signal as an input and producing as an output a foreground/background label designating the element of the spatio-temporal input signal as either foreground or background, the foreground/background separation module comprising:
a discriminant calculator that calculates for the element of the spatio-temporal signal at least two discriminant functions including a foreground discriminant function and a background discriminant function; and
a decision rules engine, by which the foreground/background separation module activates a foreground label for the element in response to the element having its foreground discriminant function exceeding its background discriminant function, and by which the foreground/background separation module activates a background label for the element in response to the element having its background discriminant function exceeding its foreground discriminant function.

28. The system of claim 27, wherein the element of the spatio-temporal input signal corresponds to a region of spatially contiguous pixels of the camera.

29. The system of claim 27, further comprising an object classification module that generates object-level information related to the element in response to the element being designated as foreground.

30. The system of claim 29, wherein the foreground discriminant function and the background discriminant function include adaptable parameters, and wherein the foreground/background separation module is configured to use the object-level information from the object classification module to adapt one or more of the adaptable parameters.

31. The system of claim 27, wherein the foreground discriminant function and the background discriminant function are based on a Markovian model of the spatio-temporal input signal.

* * * * *

UNITED STATES PATENT AND TRADEMARK OFFICE
CERTIFICATE OF CORRECTION

PATENT NO.       : 8,073,254 B2
APPLICATION NO.  : 12/611850
DATED            : December 6, 2011
INVENTOR(S)      : Saptharishi et al.

It is certified that error appears in the above-identified patent and that said Letters Patent is hereby corrected as shown below:

In column 3, line 12, after "is", insert --a--.

In column 7, line 61, at the end of the sentence, after the equation, insert a --.--.

In column 8, lines 23-25, replace equation "$\gamma_{Bg} \sqcup \bar{u}_i^T B_n R (1 - \kappa_n R)$ $\gamma_{Fg} \sqcup \bar{u}_i^T B_n \kappa_n R$" with $$\gamma_{Bg} \sqcup \bar{u}_i^T B_{n,R} (1 - \kappa_{n,R})$$
$$\gamma_{Fg} \sqcup \bar{u}_i^T B_n \kappa_{n,R}$$

-- --.

In column 10, line 44, replace "update" with --updated--.

In column 10, line 47, replace "only depends on the its" with --depends only on its--.

In column 11, line 6, replace "a adaptation of learning" with --an adaptation of a learning--.

In column 11, line 33, after "Regardless", insert --of--.

In column 13, line 7, replace equation "$P_{G_{j,n} G_{j,n-1}, R, Bg} P_{G_{j,n-1}|R, Bg}$" with $$P_{G_{j,n}|G_{j,n-1}, R, Bg} P_{G_{j,n-1}|R, Bg}$$

-- --.

Signed and Sealed this
Twenty-first Day of August, 2012

David J. Kappos
*Director of the United States Patent and Trademark Office*

CERTIFICATE OF CORRECTION (continued)
U.S. Pat. No. 8,073,254 B2

In column 13, lines 41-45, replace equation "$\underbrace{P_{G_{,n}|\Upsilon,Bg}P_{Bg|\Upsilon(R)}}_{\gamma_{Bg}} \overset{Background}{\underset{Foreground}{\gtrless}} \underbrace{P_{G_{,n}|Fg}P_{Fg|\Upsilon(R)}}_{\gamma_{Fg}}$" with -- $\underbrace{P_{G_{,n}|\Upsilon(R),Bg}P_{Bg|\Upsilon(R)}}_{\gamma_{Bg}} \overset{Background}{\underset{Foreground}{\gtrless}} \underbrace{P_{G_{,n}|Fg}P_{Fg|\Upsilon(R)}}_{\gamma_{Fg}}$ --.

In column 14, line 46, replace "an pixel" with --a pixel--.

In column 14, line 51, replace "α an β" with --α and β--.

In column 14, line 54, replace "α an β" with --α and β--.

In column 16, line 21, replace "objects" with --object's--.

In column 16, line 38, after "Regardless", insert --of--.